No. 680,328. Patented Aug. 13, 1901.
J. HENDERSON.
STAND PIPE.
(Application filed Sept. 11, 1900.)
(No Model.)
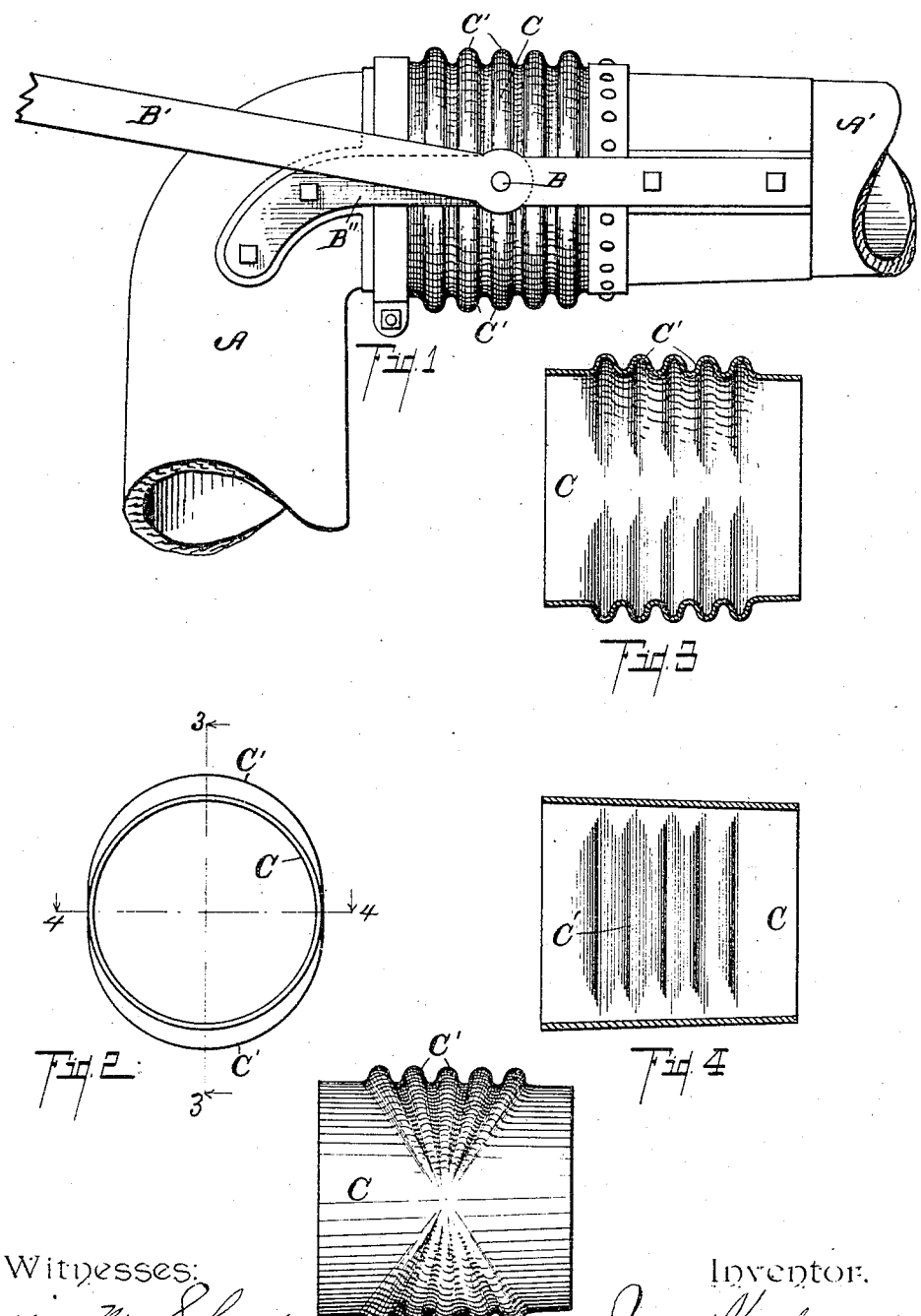
Witnesses:
Bessie M. Scherer.
Otis A. Earl
Inventor.
James Henderson
By Fred L. Chappell
Att'y.

UNITED STATES PATENT OFFICE.

JAMES HENDERSON, OF THREE RIVERS, MICHIGAN, ASSIGNOR TO THE SHEFFIELD CAR COMPANY, OF SAME PLACE.

STAND-PIPE.

SPECIFICATION forming part of Letters Patent No. 680,328, dated August 13, 1901.

Application filed September 11, 1900. Serial No. 29,721. (No model.)

*To all whom it may concern:*

Be it known that I, JAMES HENDERSON, a citizen of the United States, residing at the city of Three Rivers, in the county of St. Joseph and State of Michigan, have invented certain new and useful Improvements in Stand-Pipes, of which the following is a specification.

This invention relates to improvements in flexible joints for stand-pipes, and particularly to stand-pipes for locomotives as appears in Patent No. 596,590, issued to me January 4, 1898. With the straight rubber tube or cylindrical connection in the pipe the raising or lowering of the horizontal portion of the pipe tends to cut off the flow of the water and reduce the capacity of the pipe, and also the pipe is not easily moved to position. It is necessary also to provide a pivotal support for the metallic portions of the pipe, and therefore necessary and very desirable that the connections should yield sufficiently to permit the pipe to swing up and down.

It is the object of my invention to provide a structure which accomplishes these results permitting the easy and free movement of the pipe without restricting the passage and at the same time provide a structure which is durable. I accomplish these objects of my invention by the devices and means described in this specification.

The invention is clearly defined and pointed out in the claims.

A structure embodying the features of my invention is fully illustrated in the accompanying drawings, forming a part of this specification, in which—

Figure 1 is a detail view of a portion of a stand-pipe embodying the features of my invention. Fig. 2 is an end view of the joint portion detached from the pipe. Fig. 3 is a vertical longitudinal sectional view taken on a line corresponding to line 3 3 of Fig. 2. Fig. 4 is a longitudinal sectional view taken on line 4 4 of Fig. 2. Fig. 5 is a detail side elevation view of a modification, showing the corrugations radiating from the pivotal center.

In the drawings the sectional views are taken looking in the direction of the little arrows at the ends of the section-lines, and similar letters of reference refer to similar parts throughout the several views.

Referring to the lettered parts of the drawings, A is the upper part of the upright portion of the stand-pipe, terminating in a suitable elbow.

A' is a portion of a horizontal delivery-pipe connected to the vertical portion A by a flexible joint. This flexible joint is made, preferably, of rubber and is cast or otherwise formed with corrugations C' C' at its upper and under side, permitting the tube or cylinder to be extended or collapsed at these points without deflecting the walls of the same in such a manner as to restrict the size of the passage. The sides of the tube or joint C are preferably made flat, as by so doing material is economized and the corrugations are unnecessary at the sides. I preferably make these corrugations in lines at right angles to the joint; but they may be made in lines radial from the pivotal center. The horizontal delivery portion A' of the pipe does not depend on this joint for supporting it in position; but arms B'' extend forwardly from the vertical portion A, and arms B' extend rearwardly from the horizontal portion A' and are joined together by pivots B opposite the central portion of the rubber joint, the arm B' extending to the rear of the upright part A, where a suitable weight is attached to serve as a counterbalance.

As the weighting and counterbalancing of the pipe appear in my former patent referred to, I do not deem it necessary to fully illustrated the same here, but only so much as forms the pivotal connection opposite the joint, as that enters into the combination which I have here produced.

I have described the material as rubber, but believe that leather or other suitable flexible material might be so formed as to accomplish this result in a satisfactory manner. I have shown the structure of the joint connection of a single piece. It might be made up of several pieces suitably joined together, although it is of advantage to have the same formed of a single piece.

Having thus described my invention, what I claim as new, and desire to secure by Letters Patent, is—

1. The combination of the vertical pipe A; the horizontal delivery-pipe A'; arms extending from each side of said pipes and pivotally connected together; and a cylindrical or tubular connection C of rubber with corrugations only on its upper and under side, coacting for the purpose specified.

2. The combination of the vertical pipe A; the horizontal pipe A'; suitable pivotal connections between the same; and a flexible joint between the two pipes corrugated only on its upper and under side, for the purpose specified.

In witness whereof I have hereunto set my hand and seal in the presence of two witnesses.

JAMES HENDERSON. [L. S.]

Witnesses:
M. J. HUSS,
W. J. PREDMORE.